(12) United States Patent
Miller et al.

(10) Patent No.: US 6,366,762 B1
(45) Date of Patent: Apr. 2, 2002

(54) SYSTEM AND METHOD FOR MEASURING ROUND TRIP DELAY ON THE PAGING AND ACCESS CHANNELS

(75) Inventors: David S. Miller, Carlsbad, CA (US); Nadav Levanon, Ramat-Gan (IL); Avneesh Agrawal, San Jose, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/338,163

(22) Filed: Jun. 22, 1999

Related U.S. Application Data

(60) Provisional application No. 60/127,472, filed on Mar. 31, 1999.

(51) Int. Cl.$^7$ .......................... H04B 17/00; H04B 7/185; G01S 3/52; G01S 5/02
(52) U.S. Cl. .................... 455/67.6; 455/67.1; 455/12.1; 455/456; 342/357.05; 342/357.08; 342/351.1; 342/418
(58) Field of Search ................ 342/352, 357.05–357.06, 342/357.08–357.09, 351.1, 418, 457, 375; 455/67.6, 67.1, 456, 12.1

(56) References Cited

U.S. PATENT DOCUMENTS

| | | | |
|---|---|---|---|
| 5,280,629 A | * | 1/1994 | Lo Balbo et al. .......... 455/67.6 |
| 5,515,062 A | * | 5/1996 | Maine et al. ................. 342/457 |
| 5,943,606 A | * | 8/1999 | Kremm et al. .............. 455/12.1 |
| 6,047,161 A | * | 4/2000 | Sowles et al. .............. 455/12.1 |
| 6,107,959 A | * | 8/2000 | Levanon ...................... 342/357 |
| 6,137,441 A | * | 10/2000 | Dai et al. ............... 342/357.05 |
| 6,298,238 B1 | * | 10/2001 | Dai ............................. 355/456 |

* cited by examiner

*Primary Examiner*—Dwayne Bost
*Assistant Examiner*—Raymond B. Persino
(74) *Attorney, Agent, or Firm*—Philip R. Wadsworth; Gregory D. Ogrod

(57) ABSTRACT

A system and method for determining a round trip delay of signals transmitted between first and second objects, such as a satellite and a mobile telephone, that move relative to each other. A first signal is transmitted from the first object to the second object. The first signal is received at the second object after a propagation delay $D_1$, the delay $D_1$ being the time taken by the first signal to traverse from the first object to the second object. A frequency of the first signal is measured at the second object. The second object then transmits to the first object a second signal containing a report of the measured first frequency. The second signal is received at the first object after a propagation delay $D_2$, $D_2$ being the time taken by the second signal to traverse from the second object to the first object. The first object measures a frequency of the second signal. The first object then determines the range between the first and second object from the measured overall delay and the measured frequencies of the first and second signals.

36 Claims, 5 Drawing Sheets

SYSTEM AND METHOD FOR MEASURING ROUND TRIP DELAY ON THE PAGING AND ACCESS CHANNELS

The Appln claims benefit of Prov. No. 60/127,472 filed Mar. 31, 1999.

BACKGROUND OF THE INVENTION

I. Field of the Invention

The present invention relates generally to wireless communication systems and, more specifically, to a system and method for determining the position of a user terminal that communicates with an earth orbit satellite. Still more specifically, the invention relates to a system and method for measuring the round trip delay on the access channel between a gateway and a user terminal.

II. Description of the Related Art

There is an increasing need in the wireless communications environment for mobile phone location information. For example, with the advent of satellite telephone communications capabilities, it is important to determine the location of a user terminal (the mobile phone) for various reasons including billing and/or geopolitical boundaries. For example, position is needed to select an appropriate ground station or service provider (for example, a telephone company) for providing communication links. A service provider is typically assigned a particular geographic territory, and handles all communication links or calls with users located in that territory. A similar consideration arises when calls must be allocated to service providers based on political boundaries or various contractual relationships.

One industry in particular in which one can see the importance of position information is the commercial trucking industry. In the commercial trucking industry or delivery business, an efficient and accurate method of vehicle position determination is in demand. With ready access to vehicle location information, the trucking company obtains several advantages. The trucking company can keep the customer apprized of location, route and the estimated arrival time of payloads. The trucking company can also use vehicle location information together with empirical data on the effectiveness of routing, thereby determining the most economically efficient routing paths and procedures.

In the past, vehicle location information has been communicated to the trucking company home base by the truck drivers themselves, via telephones, as they reach destinations and stopovers. These location reports are intermittent at best, because they only occur when the truck driver has reached the destination or stopover and can take the time to phone the trucking company home base. These location reports are also quite costly to the trucking company because in effect they cause substantial down time of the freight carrying vehicle. This down time is due to the fact that to make a location report, the tractor driver must remove his vehicle from route, find a telephone which he can use to phone the home base, and take the time to make the location report. This method of location reporting also leaves room for substantial inaccuracies. For example, truck drivers may report incorrect information either mistakenly or intentionally, or report inaccurate estimates of times of arrival and departure.

Presently, the commercial trucking industry is implementing versatile mobile communication terminals for use in their freight hauling tractors. These terminals are capable of providing two-way communication between the trucking company home base and the truck. Typically, the communications are via satellite between the truck and a network communications center or hub.

Using the radio communication capabilities at each mobile terminal to provide vehicle position determination offers great advantages to the commercial trucking industry. Location reports would no longer be intermittent because the trucking company home base could locate a vehicle at will. No down time of the freight hauling vehicle would be required because the communications necessary for determining location could take place while the truck is en route. Also, inaccuracies in location reports would be virtually eliminated because the trucking company home base would be almost instantaneously ascertaining accurate vehicle location information.

However, using the radio communication capabilities at mobile terminals to provide a vehicle or user position is difficult when both the satellite and the vehicle continuously change their position. That is, when low or medium Earth orbiting (LEO or MEO) satellites are used for transferring signals, and when the user or vehicle changes location rapidly or frequently. Due to the orbit of the satellite and the movement of the vehicle, the range between them continuously changes. This makes it difficult to accurately measure the range between the satellite and the mobile phone, and ultimately the location of the phone on the earth's surface. This problem is further discussed below in an example involving two objects that communicate with each other.

Generally, the range between two objects that communicate with each other can be determined in the following way. The first object transmits a first signal and notes the time of transmission. The second object receives the first signal and immediately transmits a second signal. The first object receives the second signal and notes the total time elapsed between the transmission of the first signal and the reception of the second signal. The first object then determines the round trip delay RTD from the relationship RTD=cD/2, where c is the speed of light and D is the total time elapsed between the transmission of the first signal and the reception of the second signal. The range between the two objects can then be determined from RTD.

Unfortunately, this simple relationship (RTD=cD/2) yields an accurate value of R only if (a) the two objects have fixed positions; and (b) the oscillators of both the sending and receiving units are known and stable. In other words, if one of the objects is moving relative to the other object, and/or the oscillator of one of the transmitters is inherently unstable, the simple relationship does not yield an accurate result. Thus, if the first object is a moving object, such as an orbiting communication satellite, and the second object is another moving object, such as a mobile phone mounted on a vehicle, this relationship does not yield an accurate result. Due to the orbit of the satellite and the movement of the mobile phone, the range between the two changes during the time period D. In this scenario, $R_1$ is the range between the satellite and the mobile phone at the time the satellite transmits the first signal and $R_2$ is the range at the time the satellite receives the second signal. Needless to say, it is difficult to determine the actual ranges $R_1$ and $R_2$ between the mobile phone and the satellite. The ranges can be determined as a function of the round trip delay RTD of signals between a gateway and a mobile phone. A mechanism is therefore needed to accurately determine RTD.

Previously, since it was not possible to accurately determine either $R_1$ or $R_2$, which are the ranges from the satellite to the mobile phone at two slightly different time instances, from a measurement that involves their sum, it was difficult to effectively determine the position of the mobile phone. If a method to effectively determine $R_1$ or $R_2$ is provided, it will be possible to determine the position of the mobile phone. Using $R_1$ (or $R_2$), and the absolute Doppler, which is equivalent to the range-rate, the position of the mobile phone can be determined. Obtaining the true Doppler, which can be used in determining the range rate, is a subject of U.S. Pat. No. 6,137,441, entitled "Accurate Range and Range Rate Determination in A Satellite Communications System", which is assigned to the assignee of the present invention and is incorporated herein by reference. The technique of that disclosure is only briefly described herein (see Equation 18, infra). Thus an important consequence of determining $R_1$ and $R_2$ is that it will then be possible to obtain the position of the mobile phone.

SUMMARY OF THE INVENTION

The present invention is directed to a system and method for determining a round trip delay of signals transmitted between first and second objects, such as a satellite and a mobile telephone, that move relative to each other. In one aspect of the invention, a first signal is transmitted from the first object to the second object. The first signal is received at the second object after a propagation delay $D_1$, the delay $D_1$ being the time taken by the first signal to traverse from the first object to the second object. A frequency of the first signal is measured at the second object. The second object then transmits to the first object a second signal containing a report of the measured first frequency. The second signal is received at the first object after a propagation delay $D_2$, $D_2$ being the time taken by the second signal to traverse from the second object to the first object. The first object measures a frequency of the second signal. The first object then determines the round trip delay from the measured delays and the measured frequencies of the first and second signals.

In another aspect, the invention is directed to determining a round trip delay of signals transmitted between first and second objects that move relative to each other, in which a first signal is transmitted from the first object. The first signal is received at the second object after a propagation delay $D_1$. The second object then transmits second signal to the first object, which is received at the first object after a propagation delay $D_2$. The frequency of the second signal is measured at the first object. The first object then determines the round trip delay from the measured delays and the first signal frequency, the round trip delay being a function of the range traversed by the second signal.

In a still farther aspect, the invention is directed to determining a round trip delay of signals transmitted between first and second objects that move relative to each other, in which a first signal is transmitted from the first object and is received at the second object after a propagation delay $D_1$. The second object measures a frequency from the first signal and transmits to the first object a second signal containing a report of the measured first signal frequency. The second signal is received at the first object after a propagation delay $D_2$. The first object then determines the round trip delay from the first signal frequency, the round trip delay being a function of the delay experienced during propagation of the second signal from the second object to the first object.

Further features and advantages of the invention, as well as the structure and operation of various embodiments of the invention, are described in detail below with reference to the accompanying drawings.

BRIEF DESCRIPTION OF THE DRAWINGS

The present invention will be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Figure 1:
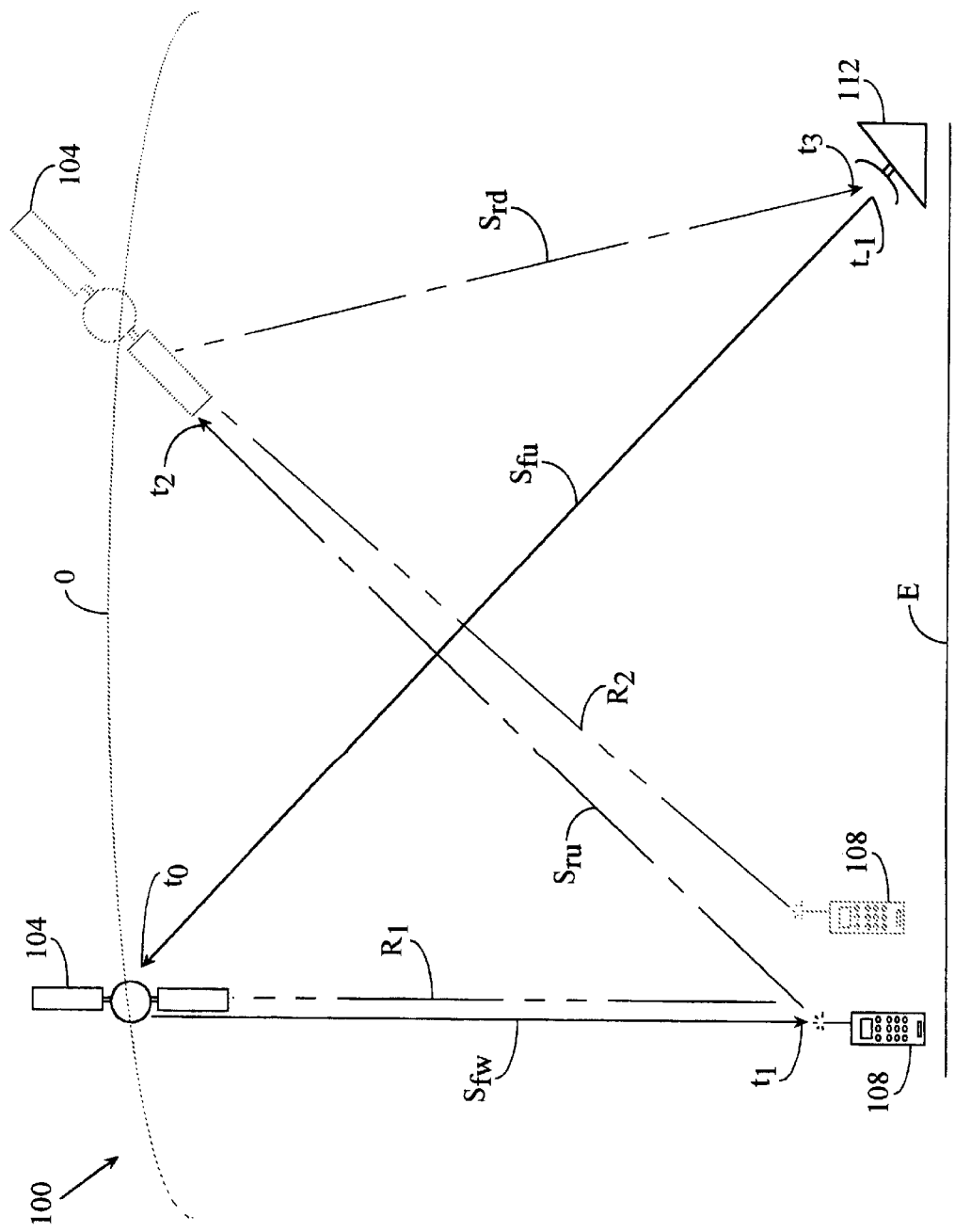
FIG. 1 illustrates a satellite communication system.

1. Overview and Discussion of the Invention

In a mobile telephone communications system, and especially in a satellite phone system, it is desirable and important to determine the position of the mobile phone unit (or user terminal). The need for the user terminal position information stems from several considerations. First, the position of the user terminal determines the geographic region in which the user is located, and that determines which service company provides communication service to the user in that region. Thus, determining the location of the user terminal is a pre-requisite to ensuring that the appropriate service provider receives billing credit for providing communication service to the user, that contracted for services or features are provided, or that the most appropriate ground stations are used.

Geopolitical issues based on political boundaries must also be taken into account in some situations. Consider the following scenario where country #1 and country #2 are unfriendly neighbors. A user terminal operates in country #1, where a service provider provides communication service. If a service provider in country #2 incorrectly receives billing credit for the service, it may be difficult to transfer the incorrectly credited amount from country #2 to country #1. If there are various contractual relationships for services for users that travel between the two countries, it may also be difficult to provide the appropriate levels of service the current user location, and so forth.

One conventional approach to position determination is that employed by the U.S. Navy's TRANSIT system. In that system, the user terminal performs continuous Doppler measurements of a signal broadcast by a low-Earth orbit (LEO) satellite. The measurements continue for several minutes. The system usually requires two passes of the satellite, necessitating a wait of more than 100 minutes. In addition, because the position calculations are performed by the user terminal, the satellite must broadcast information regarding its position (also known as "ephemeris"). Although the TRANSIT system is capable of high accuracy (on the order of one meter), the delay required in establishing a position is unacceptable for use in a commercial satellite communications system.

Another conventional approach is that employed by the ARGOS and SARSAT (Search and Rescue Satellite) systems. In that approach, the user terminal transmits an intermittent beacon signal to a receiver on the satellite, which makes frequency measurements of the signal. If the satellite receives more than four beacon signals from the user terminal, it can usually solve for the user terminal's position. Because the beacon signal is intermittent, an extended Doppler measurement, such as that performed by the TRANSIT system, is unavailable.

Another conventional approach is that employed by the Global Positioning System (GPS). In that approach, each satellite broadcasts a time-stamped signal that includes the satellite's ephemeris. When the user terminal receives a GPS signal, the user terminal measures the transmission delay relative to its own clock and determines the pseudo-range to the transmitting satellite's position. The GPS system requires three satellites for two-dimensional positioning, and a fourth satellite for three-dimensional positioning.

One disadvantage of the GPS approach is that at least three satellites are required for position determination. Another disadvantage of the GPS approach is that, because the calculations are performed by the user terminal, the GPS satellites must broadcast their ephemeris information, and the user terminal must possess the computational resources to perform the required calculations.

A disadvantage of all of the above-described approaches is that the user terminal must have a separate transmitter or receiver, in addition to that required by the communications system, in order to use those approaches.

For these reasons, many in the satellite communications environment have recognized a need for a position determination system capable of rapid position determination. Also, there is a need for a low cost position determination system that accurately determines the position of a user terminal with minimal additional resources at the satellite and the user terminal.

In a satellite communication system, the position of a mobile user terminal can be determined as a function of the range between the satellite and the mobile user terminal and the rate of change of that range. Both are a function of the round trip delay of a signal transmitted from a gateway (fixed ground station transceiver) to a mobile user terminal via a satellite interface and back to the gateway, a frequency measurement made at the mobile user terminal, and a frequency measurement made at the gateway. Because of the movement of a satellite in orbit around the earth and the movement of a mobile phone on the earth's surface, the distance or range between the two changes continuously.

The greatest contribution to the change in geometric relation between the user terminal and the satellite is due to the satellite movement. A LEO satellite travels at an orbital velocity on the order of 16,000 miles per hour or about 4.4 miles per second. The user terminal, by contrast, travels at a typical ground speed of less than 60 miles per hour (about 88 feet per second). The change in position of the user terminal is so small relative to the change in satellite position that the user terminal position change can be effectively ignored. However, due to this relative movement, it is difficult to accurately measure the distance between a mobile phone (or user terminal) and a satellite. Consequently, it is difficult to determine the position of the mobile phone. This creates a problem in wireless communication systems where there is a need to accurately determine the position of the mobile phone.

The present invention provides a solution to this problem. The present invention provides a method for determining the round trip delay of a signal transmitted between a gateway and the mobile phone. From this information, the distance or range between the mobile phone and the satellite can be determined. An important consequence of the present invention is that it also provides a method for subsequently accurately determining the position of the mobile phone.

It must be noted that the utility of the present invention is not limited to satellites and mobile phones. In fact, in a broad sense, the present invention can be utilized to determine the range between any two moving objects that communicate with each other.

2. Example Environment

Before describing the invention in detail, it is useful to describe an example environment in which the invention can be implemented. In a broad sense, the invention can be implemented in a variety of communication systems. One such communication system 100 is illustrated in FIG. 1. Specifically, FIG. 1 shows a satellite 104 moving in an orbital path O. A mobile station, phone, or user terminal 108 is located effectively at or near the surface of the earth E. Mobile phone 108 comprises a wireless communication device such as, but not limited to, a cellular telephone, or a data or position determination transceiver, and can be hand-held or vehicle-mounted as desired. However, it is also understood that the teachings of the invention may be applicable to fixed units where position determination is desired. The satellite transmits signals to, and receives signals from, mobile phone 108, called a user terminal (UT), through a fixed ground station 112, called a gateway (GW).

FIG. 1 is presented to illustrate the difficulties associated with measuring the distance between satellite 104 and mobile phone 108 in a dynamic environment. This dynamic environment is created by the movement of satellite 104 in its orbit O and the movement of UT 108 on the earth's surface, where the distance between satellite 104 and UT 108 continuously changes. This makes it difficult to accurately measure the distance between them and ultimately the position of UT 108.

In this example environment and hereinafter, gateway 112 communicates with UT 108 via satellite 104. At a time $t_1$, gateway 112 transmits a forward uplink paging signal $S_{fu}$ to satellite 104. The reason for designating this time as $t_{-1}$ will be made clear below. At time $t_0$, circuitry in satellite 104 converts signal $S_{fu}$ to a forward downlink signal $S_{fd}$ and transmits it to UT 108. UT 108 receives signal $S_{fd}$ at time $t_1$. UT 108 immediately transmits a reverse uplink signal $S_{ru}$ which is received by satellite 104 at time $t_2$. Satellite 104 converts signal $S_{ru}$ to a reverse downlink signal $S_{rd}$ which is then transmitted to gateway 112, where it is received by gateway 112 at time $t_3$. Signals $S_{fu}$ and $S_{fd}$ are transmitted on one or more paging channels. Signals $S_{ru}$ and $S_{rd}$ are transmitted on an access channel which is used by user terminals to "access" a gateway. A user terminal accesses a gateway to register with the system, to place a call, or to acknowledge a paging request sent by the gateway, by transmitting data on the access channel that contains an access message.

During the elapsed time period between times $t_0$ and $t_2$, that is, $t_2-t_0$, satellite 104 has changed its position. UT 108 may also have changed its position. However, for reasons mentioned above, the position change of UT 108 may be ignored As a result, the range between UT 108 and satellite 104 changes from $R_1$ to $R_2$. As noted above, the largest contribution to this change in position is due to the movement of the satellite in orbit.

The present invention is described in terms of this example environment. Description in these terms is provided for convenience only. It is not intended that the invention be limited to applications in this example environment. In fact, after reading the following description, it will become apparent to a person skilled in the relevant art how to implement the invention in alternative environments.

3. The Present Invention

In the present invention, gateway 112 transmits paging signal $S_{fu}$ at periodic intervals. For purposes of this invention, signal $S_{fu}$ is deemed to be transmitted by gateway 112 at time $t_{-1}$ and received by satellite 104 at time $t_0$. A transmitter, located at gateway 112, pre-corrects the frequency of forward link signal $S_{fu}$ to compensate for the Doppler shift due to the relative motion between satellite 104 and gateway 112. Because the relative motion of satellite 104 with respect to gateway 112 is well known, the signal is compensated so that when the signal reaches satellite 104, the signal does not appear to have experienced any Doppler shift due to the relative motion. In other words, signal $S_{fu}$ is pre-corrected by the transmitter to compensate for the Doppler shift.

In addition, the transmitter at gateway 112 pre-corrects the timing of signal $S_{fu}$. Signal delays on the order of 5–15 ms can occur between the time of transmission from gateway 112 to the time of receipt by satellite 104 and vice versa. Similar delays occur in signals transmitted between satellite 104 and UT 108. In the forward link, only the timing of signal $S_{fu}$ is pre-corrected. The timing of signal $S_{fu}$ is continuously adjusted so that the signal arrives at the satellite with known timing or at a known time, referred to as satellite time. Thus, the gateway transmitter adjusts the timing of signal $S_{fu}$ transmitted to satellite 104 so that the signal is synchronized at the satellite at a predetermined time regardless of the distance between the gateway and the satellite.

One result of pre-correcting the timing is that the timing uncertainty at the user terminal due to variation in propagation delay is reduced. Because the timing of the uplink portion of the forward link signal is known, the only uncertainty due to propagation delay occurs in the downlink portion of the forward link. Thus, by pre-correcting the timing, the timing uncertainty in the forward link signal is reduced by approximately one half.

Analogous post-correction adjustments to frequency and timing are made to signal $S_{rd}$, transmitted from satellite 104 to gateway 112. However, since the range between satellite 104 and UT 108 is not known, the system cannot pre-correct signals $S_{fd}$ or $S_{ru}$.

Continuously pre-correcting and post-correcting the timing of the signal in a CDMA systems results in each code in a PN spreading code sequence arriving at any particular satellite or gateway at the same time as other satellites or gateways regardless of the distance between the gateway and the satellite. In other words, the uplink portion of the forward link signal at the satellite and the downlink portion of the reverse link signal at the gateway do not exhibit any code Doppler. Preferably, therefore, signal $S_{fu}$ is pre-corrected for Doppler and time so that the signal that is received at satellite 104 is effectively seen by satellite 104 as though it had been transmitted instantaneously from gateway 112. Thus the time at which satellite 104 receives signal $S_{fu}$ is designated as time $t_0$.

Pre-correction and post-correction of signals is described in detail in U.S. patent application Ser. No. 08/723,490, entitled "Time and Frequency Correction For Non-Geostationary Satellite Communications System," filed Sep. 30, 1996, in the name of S. Kremm, the disclosure of which is incorporated by reference herein in its entirety.

As noted above, gateway 112 transmits a message as a carrier modulated signal $S_{fu}$ on the paging channel of the satellite communications system at time $t_{-1}$. This message contains at least the time of transmission of the message adjusted for the pre-correction performed by gateway 112. Satellite 104 sends carrier modulated signal $S_{fd}$ at time $t_0$.

Signal $S_{fd}$ is received by UT 108 at time $t_1$. Upon receipt of signal $S_{fd}$, UT 108 immediately transmits a carrier modulated reply message as signal $S_{ru}$. The reply message contains information to be used by gateway 112 to determine round trip delay. An important piece of information contained in the reply message is the time of receipt of signal $S_{fd}$ as perceived by UT 108. However, this time information cannot be used directly by gateway 112. The time of receipt of signal $S_{fd}$ at UT 108 is measured according to a local user terminal time based on signals provided by a local oscillator in UT 108. The problem is that the local oscillator in UT 108 is inherently unstable or variable. That is, to reduce costs and simplify circuits, UT oscillators tend to be relative inexpensive and subject to drift and other variations which make them inaccurate, creating errors in the output signal, and, thus, any time measurements based on such signals. The crystal oscillator in UT 108 may have a frequency error on the order of 10 ppm. This can introduce significant errors into the time measurements.

The reply message transmitted by UT 108 on signal $S_{ru}$ is received at satellite 104 at time $t_2$ and at gateway 112 as signal $S_{rd}$ at time $t_3$. The reply message contains information about the time at which UT 108 received the transmitted message sent by gateway 112, as that time is perceived by UT 108. Gateway 112 waits for a period of time after it begins to receive signal $S_{rd}$ before taking measurements of the information contained in signal $S_{rd}$ at time $t_4$. The goal is to wait as long as possible after the start of the message. This ensures a more accurate measurement because the time tracking circuitry locks in more solidly the longer the wait.

There is a problem with waiting too long to begin measuring the timing of the message in signal $S_{rd}$. UT 108 can start its transmission at the point at which UT 108 perceives time. However, UT 108 must construct its message and put into the message the time at which it received the message in signal $S_{fd}$ and the time at which it begins transmission of the reply message on signal $S_{rd}$. What goes into the reply message is the time $T_{RX}$ at which UT 108 received the message on signal $S_{fd}$. This is equal to the time $T_{TX}$ at which UT 108 transmits its message on signal $S_{ru}$.

The reply message signal generated by UT 108 has certain characteristics. One is that data is clocked out at a certain rate. Another characteristic is that the information signal is modulated onto a carrier frequency. Both characteristics are derived from the same inherently error prone crystal oscillator in UT 108. If gateway 112 can measure the frequency of the signal generated by UT 108 and can determine what that frequency should be, and by measurement gateway 112 knows what that frequency actually is, then gateway 112 can determine the characteristics of the local oscillator of UT 108 based on the difference in frequency measurement. Now, knowing the information about UT 108's local oscillator, which is also being used to clock the data transmitted on signals $S_{ru}$ and $S_{rd}$, gateway 112 can use that information to determine the true length of the message transmitted by UT 108. From that information, gateway 112 can then determine a better estimate of the actual beginning of the message transmitted by UT 108.

A feature of the present invention is the recognition that gateway 112 can use the frequency measurement it makes on the signal received from UT 108, and compare that measured frequency to a theoretical carrier frequency to determine a best estimate of the actual time at which UT 108 began transmitting its message. By itself, however, this measurement does not provide the necessary information to accurately determine the position of UT 108. Merely measuring the frequency of the signal transmitted by UT 108 does not take into account the Doppler effect caused by the movement of satellite 104 in its orbit. The Doppler effect causes the frequency of the received signal to differ from the frequency of the transmitted signal. Moreover, each of signals $S_{fd}$, $S_{ru}$, and $S_{rd}$ is affected by Doppler. The Doppler itself changes. This creates a second order effect which can either be accounted for in the algorithm or method steps of the invention, or can be ignored.

The method and system of the present invention makes one set of measurements needed for position determination. The present invention compensates for the errors in the internal clock timing of UT 108 to determine the distance between UT 108 and satellite 104 at some instant in time. From that, the position of UT 108 can then be determined. Gateway 112 begins to measure the signal received from UT 108 at time $t_4$. Gateway 112 then measures the length of the message received from UT 108. Gateway 112 then subtracts the message length from the time of measurement to determine the start time of the received message. This measurement provides an accurate start/receive time $t_3$ of the received signal. From this information, the distance between satellite 104 and UT 108 can be calculated.

Another measurement that is made is the carrier frequency of the signal received at gateway 112. By correcting for Doppler, the transmitting frequency of UT 108 can then be determined.

In summary, the following information is either known or can be calculated or estimated:

1. The frequency of signal $S_{rd}$ received at gateway 112 can be measured.
2. The distance between gateway 112 and satellite 104 is known to a good approximation.
3. The frequency of signal $S_{fu}$ from gateway 112 to satellite 104 is known.
4. Doppler between gateway 112 and satellite 104 is known.
5. The frequency of signal $S_{ru}$ at satellite 104 can be calculated from the above known or measured information.
6. Doppler of signal $S_{fd}$ from satellite 104 to UT 108 can be reasonably estimated.

From the foregoing known, measurable or reasonably estimable information, it is possible to correct back to estimate the transmitting frequency of UT 108.

Satellite 104 contains a translator for translating forward uplink frequencies to forward downlink frequencies and for translating reverse uplink frequencies to reverse downlink frequencies. While these frequencies are assumed to be different in the present example system, they can be the same in some communication system designs to simplify the transfer process, which will still suffer from Doppler. In the satellite the translator translates not only the nominal frequencies; it also translates the Doppler frequencies. Thus, the actual frequency that is translated is the nominal plus Doppler ($f_n + f_d$).

The present invention is primarily intended to operate in an environment in which the satellite acts only as a "bent pipe" with a frequency translator. The satellites contemplated for use with this invention do not have intelligence built into them to accomplish such tasks as correcting for Doppler. In addition, it would be very difficult for the satellite to correct for Doppler on the reverse uplink and forward downlink frequencies. This is because the satellite does not know the location of the user terminal. Furthermore, the satellite is receiving signals from and sending signals to multiple user terminals simultaneously.

Even if the locations of the user terminals were known, the satellite could not correct for Doppler for each concurrent transmission to and from multiple user terminals. It would be apparent to one skilled in the relevant arts to make the appropriate modifications in the relevant algorithms should it be desired to utilize the techniques of the present invention in a satellite system that has the intelligence to correct for Doppler on one or both of the uplink and downlink signals.

Figure 2:
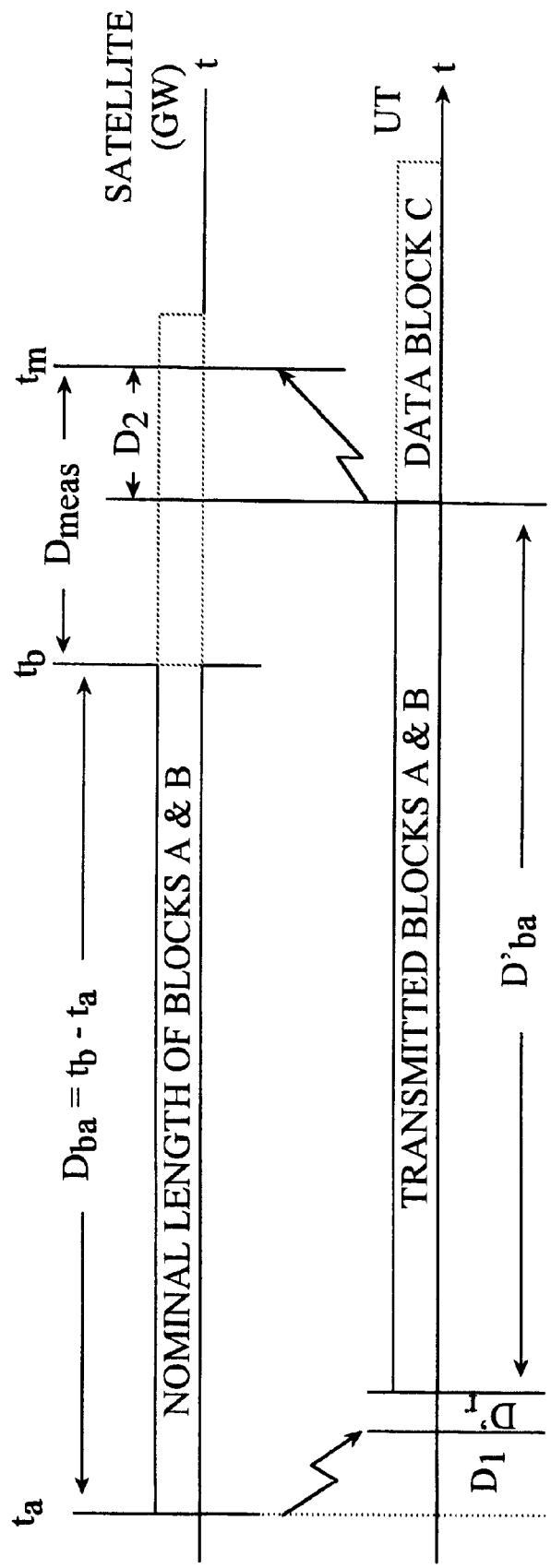
FIG. 2 is a time diagram which illustrates the method for determining the distance between a satellite and a mobile phone in accordance with the present invention.

FIG. 2 shows a timing diagram of the forward downlink and reverse uplink signals. In the figure, point $t_a$ represents the timing point of the forward downlink signal which is selected by UT 108 as the marker at which UT 108 begins its transmission of a reply signal to be used by gateway 112 to determine round trip signal delay. Time marker $t_a$ is generated by gateway 112 and its temporal position within signals $S_{fu}$ and $S_{fd}$ is known by the gateway. Marker $t_a$ is transmitted from satellite 104 as part of signal $S_{fd}$ and is received at UT 108 after a delay $D_1$. Delay $D_1$ is a function of the distance between satellite 104 and UT 108. Immediately upon receipt by UT 108 of marker $t_a$, and subject to a small built in delay $D_r$ on the order of not more than about 200 microseconds to avoid collisions between signals from different UTs, UT 108 begins transmitting a reply signal on its reverse uplink channel.

While various access signal formats can be used, a preferred structure for the access signal transmitted by UT 108 contains three parts: a preliminary preamble (block A), a main preamble (block B), and a data block (block C). Therefore, each access message is divided into a preamble address portion (blocks A and B in FIG. 2) and a data portion (data block C in FIG. 2). The transmission of each message preamble portion precedes the transmission of the data portion by a predetermined period of time to allow a gateway to adjust its tracking circuitry and synchronize with the received signal before the arrival of the data portion. The use of this type of signal is discussed in more detail in U.S. patent application Ser. No. 09/098,631, entitled "Rapid Signal Acquisition And Synchronization For Access Transmissions," filed Jun. 16, 1998 the disclosure of which is incorporated by reference herein in its entirety.

Signal $S_{ru}$ is received at satellite 104 time $t_m$. This is the point at which the end of the preamble (blocks A and B) is received by satellite 104. The delay period $D_2$ equals the satellite path delay at $t_m$, that is the delay in transmission time due to the distance between UT 108 and satellite 104. The signal comprising preamble blocks A and B and data block C is actually received at gateway 112. However, since gateway 112 knows at any one time the exact location of satellite 104, the gateway circuitry can perform post-correction on reverse downlink signal $S_{rd}$ to determine when the end of preamble blocks A and B of signal $S_{ru}$ was received at satellite 104. Data block C contains information about time marker $t_a$. Gateway 112 also knows the length of blocks A and B. Gateway 112 does not know the length of gaps $D_1$ or $D_2$ or the frequency of the signal transmitted by UT 108.

In addition, gateway 112 must take into account the Doppler frequency. An assumption can be made that the Doppler does not change significantly over the course of the transmission from UT 108 to satellite 104.

According to the present invention, gateway 112 transmits a signal on the paging channel. The signal is received by UT 108 after a propagation delay $D_1$. The distance traversed by the signal between gateway 112 and UT 108 is referred to as the forward distance.

The UT transmits a preamble portion of an access message after a predetermined guard interval $D'_r$ in order to avoid access signal collisions. The preamble portion is received by gateway 112 after a propagation delay $D_2$. The distance traversed by the preamble portion between UT 108 and satellite 104 is referred to as the reverse distance.

When UT 108 receives the signal transmitted by the gateway, it measures a first frequency from the transmitted gateway signal and relays the measurement back to gateway 112 in the data portion of the access message. Alternatively, to reduce complexity and simplify the process, the UT measures a relative offset of the received signal from the internal oscillator frequency and provides this measured offset as data to the gateway. Gateway 112 measures a second frequency from the data portion.

One goal is to solve for $D_{meas}$, which is the measured delay between the time $t_b$ that the end of the preamble portion is expected to be received and the time $t_m$ when the end of the preamble portion is actually received at satellite 104.

The present invention can be categorized into four separate but related methods. Method 1 is a high accuracy implementation requiring frequency measurements at both the UT and the gateway and yields the satellite to UT range at the time instance corresponding to the start of the access slot at the gateway. Method 2 is a less accurate approximation of method 1. Method 2 requires a frequency measurement only at the gateway. Method 3 is a high accuracy implementation requiring frequency measurements at both the UT and the gateway and yields the satellite to UT range at the time instance at which the end of the preamble portion ($t_m$) is received at the gateway. Method 4 is a less accurate version of method 3. Method 4 requires a frequency measurement only at the UT. These methods are discussed in detail below, with reference to the following index:

$t_a$=start of access probe on paging channel at satellite 104 (and at gateway 112, as a result of pre-correction).

$t_b$=$t_a$+$D_{ba}$ $t_m$=measurement at satellite 104 (and at gateway 112, as a result of post correction).

$D_{ba}$=predetermined duration of the preamble of signal $S_{ru}$ (for example, the nominal length of preamble blocks A and B of the access probe).

$D'_{ba}$=the predetermined duration of the preamble of signal $S_{ru}$ as generated with error by the UT clock error.

$D_r$=random delay between receipt of signal $S_{fd}$ at UT 108 and the start of transmission of signal $S_{ru}$ (for collision avoidance).

$D'_r$=random delay as actually generated by UT 108 due to clock error.

$D_1$=satellite-UT path delay at $t_a$ $D_2$=UT-satellite path delay at $t_m$ (satellite-gateway delay is known and pre-corrected.

$f_F$=nominal carrier frequency transmitted from the satellite to the UT (known as the "forward frequency")

$f_R$=nominal carrier frequency transmitted from the UT to the satellite (known as the "reverse frequency")

$f_{offset}$=frequency offset of the UT at the frequency $f_F$ $f_D$=Doppler shift of frequency $f_F$ $f_D/f_0$=normalized Doppler frequency $D_{meas}$=the measured delay between the expected end of the preamble portion and the actual received end of the preamble portion.

$R_1$=$R_{sat-UT}(t_a)$, ($t_a$) is a well defined time instance at gateway 112.

$R_2$=$R_{sat-UT}(t_m)$, $t_m$, when gateway 112 identifies the end of the received the preamble portion, is also a well defined time instance at gateway 112.

$\dot{R}_1$=$\dot{R}_2$=$\dot{R}$, (the range rate is assumed constant) C=velocity of light

METHOD 1

Referring now to FIG. 2, at time $t_a$, satellite 104 transmits a signal $S_{fd}$ on the paging channel. UT 108 receives signal $S_{fd}$ after a delay period $D_1$. $D_1$, which is also known as the satellite-phone path delay, is given by the relationship $$D_1 = \frac{R_1}{c}$$

where $R_1$=the distance or range between satellite 104 and UT 108 at the time of transmission of signal $S_{fd}$.

UT 108 measures the frequency of the received signal $S_{fd}$. This measurement is offset from the actual transmitted frequency due to two factors: local oscillator error of the UT's internal clock; and the Doppler effect caused by the relative movement between satellite 104 and UT 108. The measured value of the frequency of signal $S_{fd}$ as perceived by UT 108 is encoded into the data portion of signal $S_{ru}$ and transmitted back to gateway 112. Signal $S_{ru}$ is transmitted at the exact moment that time marker $t_a$ is received at the antenna of UT 108, plus, as noted above, a short delay $D_r$ to avoid signal collision.

The signal $S_{ru}$, comprising the preamble portion and data portion of the access message, is received at gateway 112 at time $t_m$. From the information contained in signal $S_{ru}$, gateway 112 can determine the time at which the end of the preamble portion was expected to arrive at gateway 112 (time $t_b$) and from this, gateway 112 can determine the round trip delay (RTD).

Note that during the time period between $t_a$ and $t_b$, due to the movement of satellite 104 in orbit, and also the movement of UT 108, both satellite 104 and UT 108 change their position. Consequently, the range between satellite 104 and UT 108 changes from $R_1$ to $R_2$.

At time $t_m$, satellite 104 receives the end of the preamble portion. The UT-satellite path delay is $D_2$ which is given by the relationship $$D_2 = \frac{R_2}{c}.$$

Also at time $t_m$, satellite 104 measures ($f_D$+$f_{offset}$) from signal $S_{ru}$.

As noted previously, the present invention provides a method to determine the round trip delay of the access channel signal in a dynamic environment created by the movement of satellite 104 and UT 108. This movement of satellite 104 and UT 108 introduces Doppler frequency $f_D$ in signal $S_{fd}$ and signal $S_{ru}$. The Doppler frequency $f_D$ is given by the relationship:

$$f_D = \dot{R}\frac{f_F}{c} \quad \text{or,} \quad \dot{R} = -f_D\frac{c}{f_F}$$

where $\dot{R}$=$dR/dt$, $f_F$ is the oscillator frequency at satellite 104 and c is the speed of light.

In order to simplify the analysis, an assumption is made that the rate of change of $R_1$ and $R_2$ is constant, i.e., $\dot{R}_1$=$\dot{R}_2$= $\dot{R}$. This implies that the Doppler frequency $f_D$ is also constant. Now, from FIG. 2 we get:

$$R_2 = R_1 + \dot{R}(t_m - t_a) \quad (1)$$

Next, we substitute $(t_m - t_a) = (D'_{ba} + D'_r + D_1 + D_2)$ in equation (1) and get:

$$R_2 = R_1 + \dot{R}(D'_{ba} + D'_r + D_1 + D_2) \quad (2)$$

Next, we substitute $-cf_D/f_F$ in equation (2) and get $$R_2 = R_1 - c\frac{f_D}{f_F}(D'_{ba} + D'_r + D_1 + D_2) \quad (3)$$

$$D_{meas} = D_1 + D'_{ba} + D'_r + D_2 - D_{ba} \quad (4)$$

Next, we substitute $D'_{ba} = D_{ba}(1 - f_{offset}/f_F)$ and $D'_r = D_r(1 - f_{offset}/f_F)$ in equation (4) and get $$D_{meas} = \frac{R_1}{c} + (D_{ba} + D_r)\left(1 - \frac{f_{offset}}{f_F}\right) + \\ \frac{R_1}{c} - \frac{f_D}{f_F}\left[(D_{ba} + D_r)\left(1 - \frac{f_{offset}}{f_F}\right) + \frac{R_1}{c} + \frac{R_2}{c}\right] - D_{ba} \quad (5)$$

or, $$D_{meas} = \frac{R_1}{c} + (D_{ba} + D_r)\left(1 - \frac{f_{offset}}{f_F}\right) - D_{ba} + \\ \frac{R_1}{c} - \frac{f_D}{f_F}\left[(D_{ba} + D_r)\left(1 - \frac{f_{offset}}{f_F}\right) + \frac{R_1}{c} + \frac{R_1}{c} - \\ \frac{f_D}{f_F}\left[(D_{ba} + D_r)\left(1 - \frac{f_{offset}}{f_F}\right) + \frac{R_1}{c} + \frac{R_2}{c}\right]\right] \quad (6)$$

or, $$D_{meas} = 2\frac{R_1}{c}\left(1 - \frac{f_D}{f_F}\right) + (D_{ba} + D_r)\left(1 - \frac{f_{offset}}{f_F}\right)\left(1 - \frac{f_D}{f_F}\right) - \\ D_{ba} + \left(\frac{f_D}{f_F}\right)^2\left[(D_{ba} + D_r)\left(1 - \frac{f_{offset}}{f_F}\right) + \frac{R_1}{c} + \frac{R_2}{c}\right] \quad (7)$$

In order to further simplify equation (7), we make the following approximation. Since both the local oscillator error frequency $f_{offset}$ and the Doppler frequency $f_D$ are very small, we ignore the terms multiplied by $f_{offset}/f_0^2$ or by $f_D^2/f_0$. As a result, we get $$D_{meas} = 2\frac{R_1}{c}\left(1 - \frac{f_D}{f_F}\right) + (D_{ba} + D_r)\left(1 - \frac{f_D + f_{offset}}{f_F}\right) - D_{ba} \quad (8)$$

Next, we rearrange equation (8) and get $$R_1 = \frac{c}{2\left(1 - \frac{f_D}{f_F}\right)}\left[D_{meas} - D_r + (D_{ba} + D_r)\frac{f_D + f_{offset}}{f_F}\right] \quad (9)$$

Note that in Equation (9) which represents method 1, $R_1$ is given as a function of $f_D$, $f_{offset}$, $f_F$, $D_{meas}$, $D_r$ and $D_{ba}$. Except for $f_D$ and $f_{offset}$, which are measured at gateway 112 and UT 108, the other terms are known. In particular, method 1 requires $(f_D + f_{offset})$ and $f_D$. Since, $(f_D + f_{offset})$ is measured at gateway 112, it is readily available at gateway 112. However, $f_D$ by itself is not readily available at gateway 112. In order to get $f_D$, UT 108 must measure $(f_D - f_{offset})$ and report the measurement to gateway 112. Then, from $(f_D + f_{offset})$ and $(f_D - f_{offset})$, $f_D$ is determined.

The principal advantage of method 1 is that it provides an accurate result for $R_1$. However, since method 1 requires both $f_D$ and $(f_D + f_{offset})$, it requires measurements at both gateway 112 and UT 108.

The robustness of Equation (9) can be easily verified by testing whether it provides a correct formula when two objects have fixed positions. When satellite 104 and UT 108 have fixed positions, $f_D$ and $f_{offset}$ are both zero. In that scenario, Equation (9) is reduced to the following equation:

$$R_1 = c\frac{D_{meas} - D_r}{2} \quad (10)$$

Thus, Equation (10) provides a correct formula when two objects have fixed positions. In reality, however, Equation (10) is solely used for verifying the various assumptions made in arriving at Equation (9) since satellite 104 and UT 108 do not have fixed positions.

METHOD 2

Since the maximum normalized Doppler shift (approximately 20 ppm) is considerably larger than normalized offset frequency, we can approximate $f_D/f_F$ by $$\frac{(f_D + f_{offset})}{f_F}$$

in method 1 to get:

$$R_1 \approx \frac{c}{2\left(1 - \frac{f_D + f_{offset}}{f_F}\right)}\left[D_{meas} - D_r + (D_{ba} + D_r)\frac{f_D + f_{offset}}{f_F}\right] \quad (11)$$

Note that method 2, which is given by Equation (11), requires only one measurement at gateway 112. Thus, method 2 eliminates an additional measurement at UT 108. However, method 2 is less accurate than method 1, and the worst case normalized error in method 2 is $f_{offset}/f_F$.

METHOD 3

As noted previously, method 3 provides a solution for $R_2$. Method 3 differs from method 1 by expressing $R_1$ as a function of $R_2$. From equation (1), we get:

$$R_1 = R_2 - \dot{R}(t_m - t_a) = R_2 - \dot{R}(D'_{ba} + D_r + D_1 + D_2) \quad (12)$$

Following an analysis similar to the one performed in method 1, we get:

$$R_1 \approx \frac{c}{2\left(1 + \frac{f_D}{f_F}\right)}\left[D_{meas} - D_r - (D_{ba} + D_r)f_D - \frac{f_{offset}}{f_F}\right] \quad (13)$$

Note that Equation (13) requires both $(f_D - f_{offset})$ and $f_D$. Since $(f_D - f_{offset})$ is measured at the UT, it is readily available at the UT. However, $f_D$ is available only if in addition to the measurement at the UT, the gateway performs its own measurement. The principal advantage of method 3 is that it provides an accurate result for $R_2$. However, method 3 requires measurements at both the gateway and the UT.

The robustness of Method 3 can also be verified by assuming that the satellite 104 and UT 108 have fixed positions. When satellite 104 and UT 108 are assumed to have fixed positions, we get:

$$R_2 = c \frac{D_{meas} - D_r}{2} \quad (14)$$

METHOD 4

Since the maximum normalized Doppler shift (approximately 20 ppm) is much greater than normalized offset frequency, we can approximate $f_D/f_F$ by in $$\frac{(f_D - f_{offset})}{f_F}$$

method 3 to get:

$$R_2 \approx \frac{c}{2\left(1 + \frac{f_D + f_{offset}}{f_F}\right)} \left[ D_{meas} - D_r + (D_{ba} + D_r) \frac{f_D + f_{offset}}{f_F} \right] \quad (15)$$

Note that method 4 requires only one measurement at the UT. Thus, method 4 eliminates an additional measurement at the gateway.

Two measured frequencies are available at gateway 112, as follows:

1) the reported measurement from the UT:

$$f_{meas,UT} = f_F \left( -\frac{\dot{R}}{c} - \frac{f_{offset}}{f_F} \right) \quad (16)$$

where $f_F$=the forward link carrier frequency (2500 MHz).

2) the measurement performed at the GW itself:

$$f_{meas,GW} = f_R \left( -\frac{\dot{R}}{c} + \frac{f_{offset}}{f_F} \right) \quad (17)$$

where $f_R$=the reverse link carrier frequency (1600 MHz).

Adding and subtracting (16) and (17) yields both the UT offset and the range-rate:

$$\dot{R} = -\frac{c}{2} \left( \frac{f_{meas,GW}}{f_R} + \frac{f_{meas,UT}}{f_F} \right) \quad (18)$$

$$\frac{f_{offset}}{f_F} = \frac{1}{2} \left( \frac{f_{meas,GW}}{f_R} - \frac{f_{meas,UT}}{f_f} \right) \quad (19)$$

The Doppler and offset frequencies at the forward frequency are:

$$f_D \ @ \ f_F = -\frac{\dot{R}}{c} f_F = \frac{1}{2} \left( \frac{f_F}{f_R} f_{meas,GW} + f_{meas,UT} \right) \quad (20)$$

$$f_{offset} \ @ \ f_F = \frac{1}{2} \left( \frac{f_F}{f_R} f_{meas,GW} - f_{meas,UT} \right) \quad (21)$$

The difference between the time of the GW and the UT measurements is accounted for as follows:

$$\dot{R}_1 \neq \dot{R}_2$$

$$f_{meas,UT} = f_F \left( -\frac{\dot{R}_1}{c} - \frac{f_{offset}}{f_F} \right) \quad (22)$$

$$f_{meas,GW} = f_R \left( -\frac{\dot{R}_2}{c} + \frac{f_{offset}}{f_F} \right) \quad (23)$$

$$\bar{f}_D \ @ \ f_F = -\frac{\dot{R}_1 + \dot{R}_2}{2c} f_F = \frac{1}{2} \left( \frac{f_F}{f_R} f_{meas,GW} + f_{meas,UT} \right) \quad (24)$$

$$f_{offset} \ @ \ f_F = \frac{1}{2} \left( \frac{f_F}{f_R} f_{meas,GW} - f_{meas,UT} \right) + \frac{f_F}{2c} (\dot{R}_2 - \dot{R}_1) \quad (25)$$

$$\approx \frac{1}{2} \left( \frac{f_F}{f_R} f_{meas,GW} - f_{meas,UT} \right)$$

Figure 3:
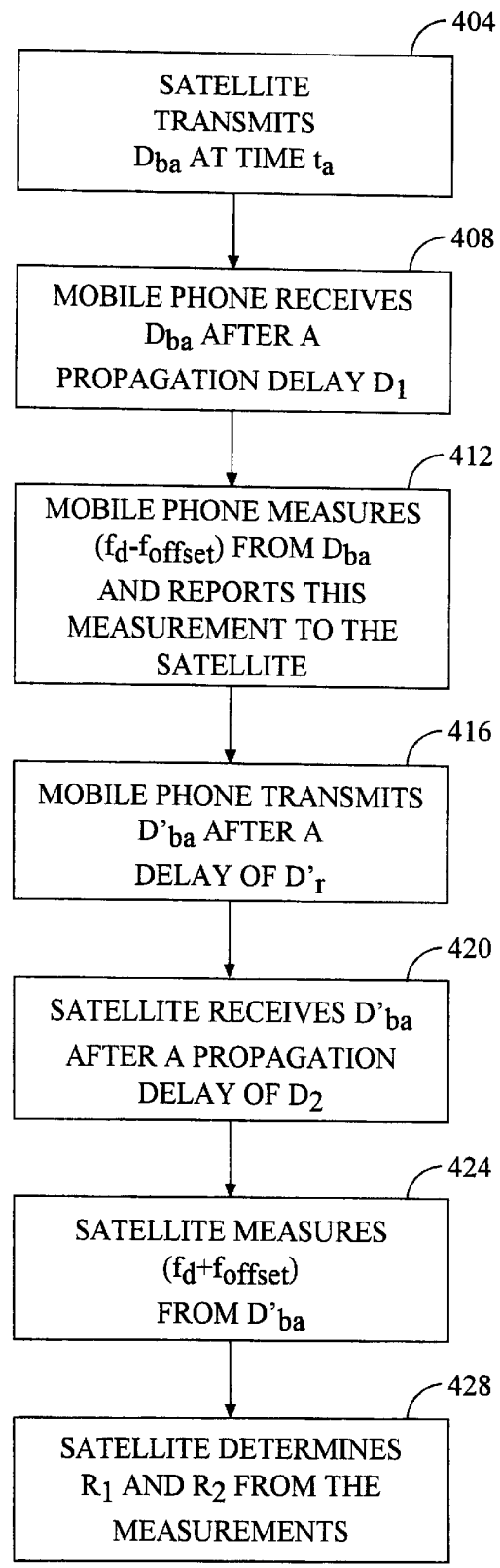
FIG. 3 is a flow diagram illustrating methods 1 and 3 in accordance with the present invention.

FIG. 3 is a flow diagram illustrating both methods 1 and 3. Referring now to FIG. 3, in step 404, gateway 112 transmits signal $S_{fd}$ at time $t_a$. Next, in step 408, UT 108 receives signal $S_{fd}$ after a propagation delay $D_1$. Next, in step 412, UT 108 measures ($f_D - f_{offset}$) from signal $S_{fd}$ and reports the measurement to the gateway. In step 416, UT 108 transmits signal $S_{ru}$ after a delay of $D'_r$. In step 420, gateway 112 receives signal $S_{ru}$ after a propagation delay of $D_2$. In step 424, gateway 112 measures ($f_D + f_{offset}$) from signal $S_{ru}$. Finally, in step 428, gateway 112 determines $R_1$ and $R_2$ from the measurements.

Figure 4:
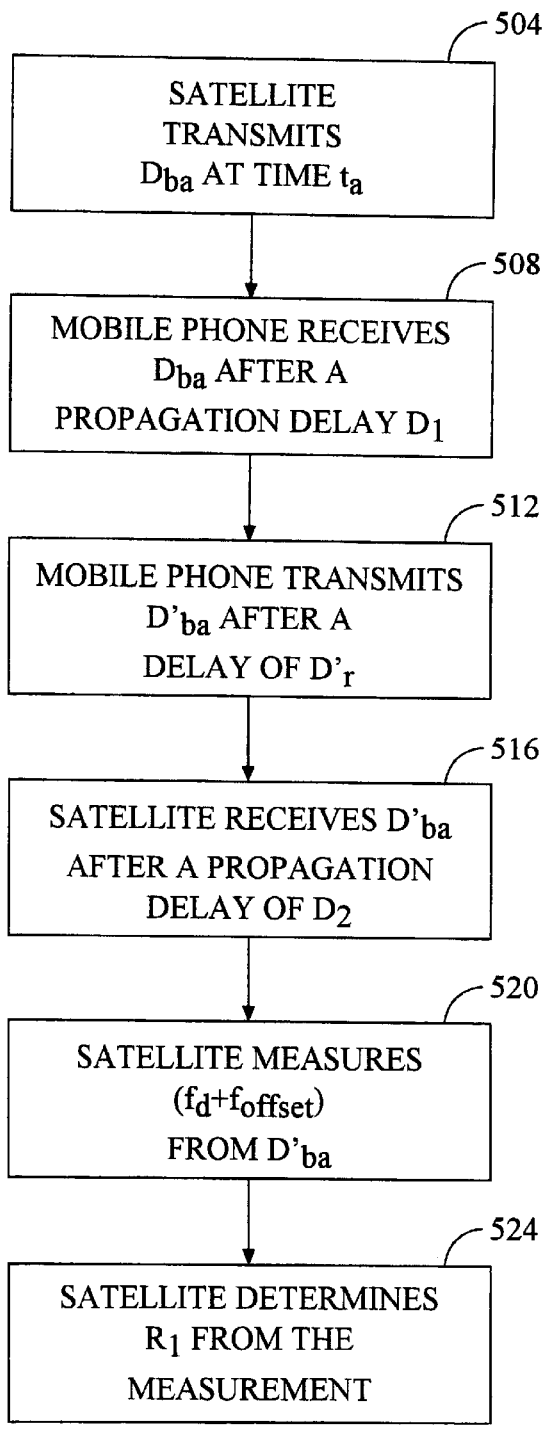
FIG. 4 is a flow diagram illustrating method 2 in accordance with the present invention.
Figure 5:
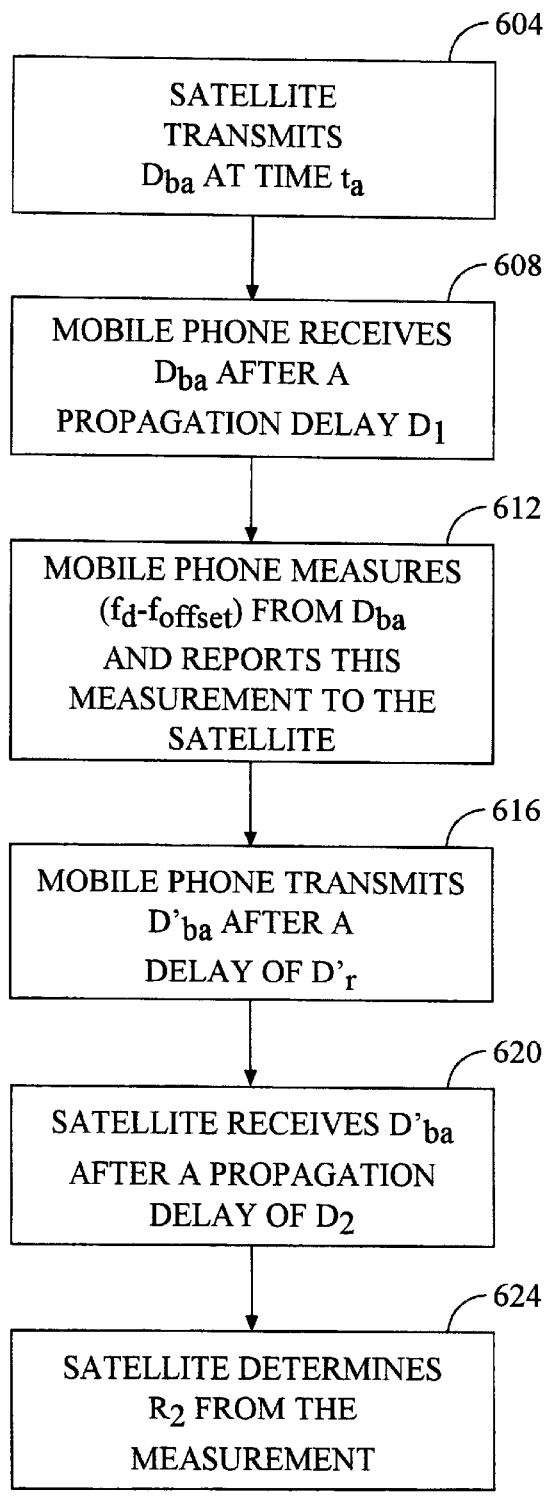
FIG. 5 is a flow diagram illustrating method 4 in accordance with the present invention.

FIG. 4 is a flow diagram illustrating the steps involved in method 2 and FIG. 5 is a flow diagram illustrating the steps involved in method 4. Since the steps involved in methods 2 and 4 are very similar to the steps in methods 1 and 3, they will not be separately described herein.

The present invention contemplates that the ranges $R_1$ and $R_2$ and the location of the UT 108 can also be determined at the UT. In one alternate embodiment of the present invention, UT 108 measures ($f_D - f_{offset}$) from $D_{ba}$. Gateway 112 measures ($f_D - f_{offset}$) from $D'_{ba}$ and reports the measurement to UT 108. Using these two measurements, UT 108 determines $R_1$ and $R_2$. Finally, UT 108 determines its own location using the method described before.

In summary, the present invention provides four different methods for determining $R_1$ or $R_2$. Methods 1 and 2 provide solutions for $R_1$. Method 1 provides a highly accurate solution for $R_1$, but it requires two frequency measurements. Method 2 requires only one frequency measurement, but is less accurate than method 1. Methods 3 and 4 provide solutions for $R_2$. Method 3 provides a highly accurate solution for $R_2$, but it also requires two frequency measurements. Method 4 requires only one frequency measurement, but it is less accurate than method 3.

The present invention also provides a method to determine the range-rate between the satellite and the UT (Equation 8). The information of the RTD and the range-rate is sufficient to determine the location of a UT on the earth's surface.

While various embodiments of the present invention have been described above, it should be understood that they have been presented by way of example only, and not limitation. Thus, the breadth and scope of the present invention should not be limited by the above-described exemplary embodiments, but should be defined only in accordance with the following claims and their equivalents.

What we claim as our invention is:

1. A method for determining a round trip delay of signals transmitted between first and second objects that move relative to each other, comprising:

transmitting a first signal from said first object to said second object;

receiving said first signal at said second object after a propagation delay $D_1$, said delay $D_1$ being the time taken by said first signal to traverse from said first object to said second object;

measuring at said second object, a first frequency associated with said first signal;

transmitting from said second object to said first object, a second signal containing a report of the measured first frequency;

receiving said second signal at said first object after a propagation delay $D_2$, $D_2$ being the time taken by said second signal to traverse from said second object to said first object;

measuring an elapsed time between the transmitting of the first signal and the receiving of the second signal;

measuring at said first object, a second frequency associated with said second signal; and determining said round trip delay at said first object, said round trip delay being based upon (i) the measured first and second frequencies and (ii) the measured elapsed time.

2. The method according to claim 1, wherein said first object is a wireless telephone system orbiting satellite and said second object is a wireless telephone system user terminal (UT).

3. The method according to claim 1, wherein said first object is a wireless telephone system gateway and said second object is a wireless telephone system user terminal (UT).

4. The method according to claim 1, wherein said first frequency is $(f_D - f_{offset})$, where $f_D$ is the Doppler frequency of the first signal transmitted between said first object and said second object and $f_{offset}$ is the second object's local oscillator error frequency.

5. The method according to claim 1, wherein said second frequency is $(f_D + f_{offset})$, where $f_D$ is the Doppler frequency the second signal transmitted between said second object and said first object and $f_{offset}$ is the second object's local oscillator error frequency.

6. The method of claim 1, wherein the transmitting at said second object occurs within a predetermined time of receipt of said first signal.

7. A method for determining a round trip delay of signals transmitted between first and second objects that move relative to each other, comprising the steps of:

transmitting a first signal from said first object;

receiving said first signal at said second object after a propagation delay $D_1$;

transmitting a second signal from said second object to said first object upon receipt of said first signal;

receiving said second signal at said first object after a propagation delay $D_2$;

measuring, at said first object, a frequency from said second signal; and determining, at said first object, said round trip delay from said frequency, said round trip delay being a function of the delay experienced by said first signal during propagation from said first object to said second object.

8. The method according to claim 7, wherein said measured frequency is $(f_D + f_{offset})$, where $f_D$ is the Doppler frequency of the second signal and $f_{offset}$ is the second object's local oscillator error frequency.

9. The method according to claim 7, wherein said first object is a wireless telephone system orbiting satellite and said second object is a wireless telephone system user terminal (UT).

10. The method according to claim 7, wherein said first object is a wireless telephone system gateway and said second object is a wireless telephone system user terminal (UT).

11. A method for determining a round trip delay of signals transmitted between first and second objects that move relative to each other, comprising the steps of:

transmitting a first signal from said first object;

receiving said first signal at said second object after a propagation delay $D_1$;

measuring, at said second object, a frequency from said first signal;

transmitting, from said second object to said first object, a second signal containing a report of the measured first signal frequency;

receiving, at said first object, said second signal after a propagation delay $D_2$; and determining, at said first object, said round trip delay from said first signal frequency, said round trip delay being a function of the delay experienced during propagation of said second signal from said second object to said first object.

12. The method according to claim 11, wherein said frequency is $(f_D - f_{offset})$, where $f_D$ is the Doppler frequency of the first signal and $f_{offset}$ is the second object's local oscillator error frequency.

13. The method according to claim 11, wherein said first object is a wireless telephone system orbiting satellite and said second object is a wireless telephone system user terminal (UT).

14. The method according to claim 11, wherein said first object is a wireless telephone system gateway and said second object is a wireless telephone system user terminal (UT).

15. A system for determining a round trip delay of signals transmitted between first and second objects that move relative to each other, comprising:

means for transmitting a first signal from said first object;

means for receiving said first signal at said second object after a propagation delay $D_1$, said delay $D_1$ being the time taken by said first signal to traverse from said first object to said second object;

means for measuring at said second object, a first frequency associated with said first signal;

means for transmitting from said second object to said first object, a second signal containing a report of the measured first frequency;

means for receiving said second signal at said first object after a propagation delay $D_2$, $D_2$ being the time taken by said second signal to traverse from said second object to said first object;

means for measuring an elapsed time between the transmitting of the first signal and the receiving of the second signal;

means for measuring at said first object, a second frequency from said second signal; and means for determining said round trip delay at said first object, said round trip delay being based upon (i) the measured first and second frequencies and (ii) the measured elapsed time.

16. The system according to claim 15, wherein said first frequency is $(f_D - f_{offset})$, where $f_D$ is the Doppler frequency of the first signal and $f_{offset}$ is the second object's local oscillator error frequency.

17. The system according to claim 16, wherein said second frequency is $(f_D + f_{offset})$, where $f_D$ is the Doppler frequency and $f_{offset}$ is the second object's local oscillator error frequency.

18. The system according to claim 15, wherein said first object is a wireless telephone system orbiting satellite and said second object is a wireless telephone system user terminal (UT).

19. The system according to claim 15, wherein said first object is a wireless telephone system gateway and said second object is a wireless telephone system user terminal (UT).

20. A system for determining a round trip delay of signals transmitted between first and second objects that move relative to each other, comprising:
   means for transmitting a first signal from said first object;
   means for receiving said first signal at said second object after a propagation delay
   means for measuring at said second object, a first frequency associated with said first signal;
   means for transmitting from said second object to said first object, a second signal containing a report of the measured first frequency;
   means for receiving said second signal at said first object after a propagation delay of $D_2$;
   means for measuring an elapsed time between the transmitting of the first signal and the receiving of the second signal;
   means for measuring at said first object, a second frequency associated with said second signal; and
   means for determining said round trip delay at said first object, said round trip delay being based upon (i) the measured first and second frequencies and (ii) the measured elapsed time.

21. The system according to claim 20, wherein said first frequency is $(f_D - f_{offset})$, where $f_D$ is the Doppler frequency of said first signal and $f_{offset}$ is the second object's local oscillator error frequency.

22. The system according to claim 21, wherein said second frequency is $(f_D + f_{offset})$, where $f_D$ is the Doppler frequency of said second signal and $f_{offset}$ is the second object's local oscillator error frequency.

23. The system according to claim 20, wherein said first object is a wireless telephone system orbiting satellite and said second object is a wireless telephone system user terminal (UT).

24. The system according to claim 20, wherein said first object is a wireless telephone system gateway and said second object is a wireless telephone system user terminal (UT).

25. A system for determining a round trip delay of signals transmitted between first and second objects that move relative to each other, comprising:
   means for transmitting a first signal from said first object;
   means for receiving said first signal at said second object after a propagation delay $D_1$;
   means for transmitting a second signal from said second object to said first object upon receipt by said second object of said first signal;
   means for receiving said second signal at said first object after a propagation delay $D_2$;
   means for measuring, at said first object, a frequency from said second signal; and
   means for determining, at said first object, said round trip delay from said frequency, said round trip delay being a function of the delay experienced during propagation of said first signal from said first object to said second object.

26. The system according to claim 25, wherein said frequency is $(f_D + f_{offset})$, where $f_D$ is the Doppler frequency of said second signal and $f_{offset}$ is the second object's local oscillator error frequency.

27. The system according to claim 25, wherein said first object is a wireless telephone system orbiting satellite and said second object is a wireless telephone system user terminal (UT).

28. The system according to claim 25, wherein said first object is a wireless telephone system gateway and said second object is a wireless telephone system user terminal (UT).

29. A system for determining a round trip delay of signals transmitted between first and second objects that move relative to each other, comprising:
   means for transmitting a first signal from said first object;
   means for receiving said first signal at said second object after a propagation delay $D_1$;
   means for measuring, at said second object, a frequency from said first signal;
   means for transmitting, from said second object to said first object, a second signal containing a report of the measured first signal frequency;
   means for receiving, at said first object, said second signal after a propagation delay $D_2$; and
   means for determining, at said first object, said round trip delay from said measured first signal frequency, said round trip delay being a function of the delay experienced during propagation of said second signal from said second object to said first object.

30. The system according to claim 29, wherein said frequency is $(f_D - f_{offset})$, where $f_D$ is the Doppler frequency and $f_{offset}$ is the second object's local oscillator error frequency.

31. The system according to claim 29, wherein said first object is a wireless telephone system orbiting satellite and said second object is a wireless telephone system user terminal (second object).

32. The system according to claim 29, wherein said first object is a wireless telephone system gateway and said second object is a wireless telephone system user terminal (UT).

33. A method for determining a round trip delay of signals transmitted between first and second objects that move relative to each other, comprising:
   transmitting a first signal from said first object;
   receiving said first signal at said second object after a propagation delay $D_1$;
   transmitting a second signal from said second object to said first object upon receipt of said first signal;
   receiving said second signal at said first object after a propagation delay $D_2$;
   measuring an elapsed time between the transmitting of the first signal and the receiving of the second signal;
   measuring at said first object a frequency associated with said second signal; and
   determining said round trip delay at said first object, said round trip delay being based upon (i) the measured frequency and (ii) the measured elapsed time.

34. A method for determining a round trip delay of signals transmitted between first and second objects that move relative to each other, comprising:
   transmitting a first signal from said first object;
   receiving said first signal at said second object after a propagation delay $D_1$;

measuring at said second object, a frequency associated with said first signal;

transmitting from said second object to said first object, a second signal containing a report of the measured first signal frequency;

receiving at said first object, said second signal after a propagation delay $D_2$;

measuring an elapsed time between the transmitting of the first signal and the receiving of the second signal; and determining said round trip delay at said first object, said round trip delay being based upon (i) the measured first signal frequency and (ii) the measured elapsed time.

35. A system for determining a round trip delay of signals transmitted between first and second objects that move relative to each other, comprising:

means for transmitting a first signal from said first object;

means for receiving said first signal at said second object after a propagation delay $D_1$;

means for transmitting a second signal from said second object to said first object upon receipt by said second object of said first signal;

means for receiving said second signal at said first object after a propagation delay $D_2$;

means for measuring at said first object, a frequency associated with said second signal;

measuring an elapsed time between the transmitting of the first signal and the receiving of the second signal; and means for determining said round trip delay at said first object, said round trip delay being based upon (i) the measured frequency and (ii) the measured elapsed time.

36. A system for determining a round trip delay of signals transmitted between first and second objects that move relative to each other, comprising:

means for transmitting a first signal from said first object;

means for receiving said first signal at said second object after a propagation delay $D_1$;

means for measuring at said second object, a frequency associated with said first signal;

means for transmitting from said second object to said first object, a second signal containing a report of the measured first signal frequency;

means for receiving at said first object, said second signal after a propagation delay $D_2$;

measuring an elapsed time between the transmitting of the first signal and the receiving of the second signal; and means for determining said round trip delay at said first object, said round trip delay being based upon (i) the measured first signal frequency and (ii) the measured elapsed time.

* * * * *